(12) United States Patent
Cornelissen et al.

(10) Patent No.: US 9,796,877 B2
(45) Date of Patent: Oct. 24, 2017

(54) COATING COMPOSITION AND METHOD

(71) Applicants: SHELL INTERNATIONALE RESEARCH MAATSCHAPPIJ B.V., The Hauge (NL); SHELL OIL COMPANY, Houston, TX (US)

(72) Inventors: Erik Kerst Cornelissen, Rijswijk (NL); Gerbrand Jozef Maria Van Eijden, Rijswijk (NL); Frank Ruckert, Rijswijk (NL); Wouter Besijn, Rijswijk (NL)

(73) Assignee: SHELL OIL COMPANY, Houston, TX (US)

( * ) Notice: Subject to any disclaimer, the term of this patent is extended or adjusted under 35 U.S.C. 154(b) by 61 days.

(21) Appl. No.: 14/779,697

(22) PCT Filed: Mar. 21, 2014

(86) PCT No.: PCT/EP2014/055690
§ 371 (c)(1),
(2) Date: Sep. 24, 2015

(87) PCT Pub. No.: WO2014/154577
PCT Pub. Date: Oct. 2, 2014

(65) Prior Publication Data
US 2016/0040038 A1 Feb. 11, 2016

(30) Foreign Application Priority Data
Mar. 25, 2013 (EP) .................................... 13160844

(51) Int. Cl.
*C09D 183/04* (2006.01)
*C09D 5/00* (2006.01)
(Continued)

(52) U.S. Cl.
CPC ............. *C09D 183/04* (2013.01); *B05D 1/28* (2013.01); *C09D 5/00* (2013.01); *C09D 175/04* (2013.01); *E21B 17/00* (2013.01)

(58) Field of Classification Search
None
See application file for complete search history.

(56) References Cited

U.S. PATENT DOCUMENTS

| 4,434,076 A | 2/1984 | Mardis et al. |
| 6,848,505 B2 | 2/2005 | Richard et al. |
| (Continued) | | |

FOREIGN PATENT DOCUMENTS

| WO | 2005012686 | 2/2005 |
| WO | 2006065144 | 6/2006 |

OTHER PUBLICATIONS

PCT International Search Report, Application No. PCT/EP2014/055690 dated Apr. 24, 2014.

*Primary Examiner* — Michael Wieczorek
*Assistant Examiner* — Bradford Gates (57) ABSTRACT

The invention concerns a method of applying a coating in a liquid state to wellbore tubing, such as threaded connector parts or casing sections, before running the tubing downhole. The coating only cures while running downhole. The coating is an elastic curable coating composition, comprising a curable elastic thermosetting resin, a curing agent and a water-absorbing expansion agent. During make-up of a connector, the liquid coating composition acts as lubricant. When cured, the coating will swell when contacted with a wellbore fluid to ensure leak-tightness.

20 Claims, 4 Drawing Sheets

(51) Int. Cl.
*E21B 17/00* (2006.01)
*B05D 1/28* (2006.01)
*C09D 175/04* (2006.01)

(56) References Cited

U.S. PATENT DOCUMENTS

| | | | | |
|---|---|---|---|---|
| 2004/0055758 | A1* | 3/2004 | Brezinski | E21B 33/12 |
| | | | | 166/384 |
| 2005/0211445 | A1* | 9/2005 | Ravi | E21B 33/14 |
| | | | | 166/380 |
| 2007/0056735 | A1* | 3/2007 | Bosma | C09K 8/508 |
| | | | | 166/295 |
| 2012/0312560 | A1* | 12/2012 | Bahr | E21B 33/1208 |
| | | | | 166/387 |
| 2013/0037267 | A1* | 2/2013 | Regnault de la Mothe | C08F 220/56 |
| | | | | 166/293 |

* cited by examiner

COATING COMPOSITION AND METHOD

CROSS-REFERENCE TO RELATED APPLICATIONS

The present application is a National Stage (§371) of International Application No. PCT/EP2014/055690, filed Mar. 21, 2014, which claims priority from European Application No. 13160844.0, filed Mar. 25, 2013, the disclosures of each of which are hereby incorporated by reference in their entirety.

The present invention relates to a coating composition and to a method of use thereof. The coating composition can swell upon contact with a selected fluid and may for instance be applied on tubular casing for use in a wellbore, for sealing a space in said wellbore.

A wellbore or borehole may relate to any hole drilled for the exploration or production of natural resources such as hydrocarbons. A trajectory of the wellbore or borehole may include both vertical and horizontal sections. The borehole may be constructed for many different purposes, including the extraction of petroleum or gases (such as natural gas), water, as part of a geotechnical investigation, environmental site assessment, mineral exploration, temperature measurement, as a pilot hole, for instance for installing underground utilities, or for geothermal installations. In addition to the production of hydrocarbons, liquid or gas may also be pumped into the borehole, for instance for underground storage of $CO_2$ (e.g. for carbon capture and storage).

The borehole is typically made by drilling subsequent sections into the earth, using a drilling rig. When a section has been drilled, steel pipe (which may be referred to as casing or liner), having a slightly smaller outer diameter than the inner diameter of the borehole section, may be introduced in the hole. Typically, the borehole is completed by installing sections of a steel pipe (casing) and well screen to keep the borehole from caving. This also helps prevent surface contaminants from entering the borehole and protects any installed pump from drawing in sand and sediment. Cement may be inserted in the annulus between the outside of the casing and the borehole wall. The casing provides structural integrity to the newly drilled wellbore. The cement isolates potentially dangerous high pressure zones from each other and from the surface.

In practice, a significant proportion of wellbores has sustained casing pressure caused by fluid communication in the annulus outside of the casing. In general this problem is attributed to the failure of cement, either due to poor placement of the cement or to the generation of micro annuli during the lifetime of the wellbore. Micro annuli may be formed in the cement during temperature or pressure cycles in the wellbore. These cycles may result in de-bonding of the cement from the casing. Thus, there is a need for a self-healing system for closing micro annuli between the cement and the casing.

It is known to use systems that swell upon contact with water or hydrocarbons and thereby provide a seal.

WO-2005/012686 discloses a system for sealing a space in a wellbore formed in an earth formation. The system comprises a swellable body for sealing said space upon swelling of the body. The swellable body swells upon migration of water into the swellable body by osmosis. The system comprises rings of polymer base material mixed with a soluble salt, which is vulcanized onto pipe sections. These pipe sections are included in the drill string, to provide swellable packers at selected locations in a wellbore.

WO-2006/065144 relates to a method and a device for sealing a void incompletely filled with a cast material, in which an expandable material is placed in the void which is to be filled with a cast material. The material expands after the cast material has cured into spaces which are not filled with cast material. The expandable material swells upon contact with water, oil, gas or other suitable materials.

U.S. Pat. No. 6,848,505 discloses a method of sealing casing or liners in a wellbore. The stands of casing or liner receive a jacket bonded to the outer surface. Preferably, the jacket is a rubber compound bonded to the outer wall. The formulation responds to wellbore fluids to swell at a predetermined rate. The casing or liner can also be expanded with a swage preferably prior to the onset of significant jacket swelling. Packers and sealing hangers can be optionally added at the extremes of the casing or liner string to further secure against channeling between adjacent formations.

The above references concern swell packers. These are preformed and need to be mounted onto the casing before the casing is installed in the borehole. Manufacturing of these swell packers takes place in dedicated workshops and includes a heat treatment step to cure and adhere the swell packer to the steel tube or casing. The heat treatment requires large ovens dedicated to this curing process. Therefore, it is impossible to prepare the swell packers at a drilling site or any remote location.

In addition, the conventional swell packers are relatively thick. Where the difference between the inner diameter of the borehole and the outer diameter of the casing is small, the thickness of the swell packers as described above may be a problem. Moreover, the relative thickness affects the expansion behavior of the swell packers. For instance, the swell packers will generally not swell, or at least swell insufficiently, when in contact with moisture in a gas phase (e.g., a methane phase saturated with water). Nor do the conventional swell packers swell with methane gas. Methane molecules are too small to cause swell of oil swell packers. Therefore traditional oil or water swell packers are therefore unsuitable to prevent the problem of micro annuli in the cement in gas wells.

The problem underlying the current invention is to find an improved means of solving the problem of micro annuli between the cement and the casing, also in gas wellbores.

The invention provides a method of applying a coating to a wellbore tubing, comprising the steps of:
providing a coating composition in a liquid state at a selected wellbore site, the coating composition comprising a curable elastic thermosetting resin, a curing agent and a water-absorbing expansion agent;
applying a coating layer of the coating composition to a selected location of the wellbore tubing;
introducing the wellbore tubing including the coating layer in the wellbore; and
allowing the coating layer to cure from a liquid state to a solid state during a preselected curing time period.

The present invention provides a solution to the above problem in the form of a coating composition which is readily available at a drilling site in liquid form. The liquid coating is applied to selected locations of the wellbore tubing, for instance to a pin section and/or a box section of a threaded tubing connector, before being run into the wellbore where the coating cures. The cured coating will be in a solid state, i.e. a non-liquid form which may include an elastic form. As the coating is liquid during application, the coating will also function as lubricant during make-up of the connector, thus obviating a separate lubricant while also improving leak-tightness of the connector when the coating has cured.

The coating composition preferably includes an elastic curable coating composition, which is stable under alkaline conditions (in view of the cement), comprising a curable elastic thermosetting resin, a curing agent and a water-absorbing expansion agent.

Also claimed is a coated casing and a well system comprising a borehole wherein the coated casing is applied.

According to another aspect, the invention provides a method of applying a coating composition.

Additional details and features of the invention will be described below with reference to the drawings, wherein.

Wellbores come in many varieties. There can be water wellbores and hydrocarbon wellbores for producing oil, natural gas or a combination thereof. The coating according to the present invention is for instance suitable for application in hydrocarbon wellbores. The coating can be applied in onshore and offshore wellbores.

Figure 1:
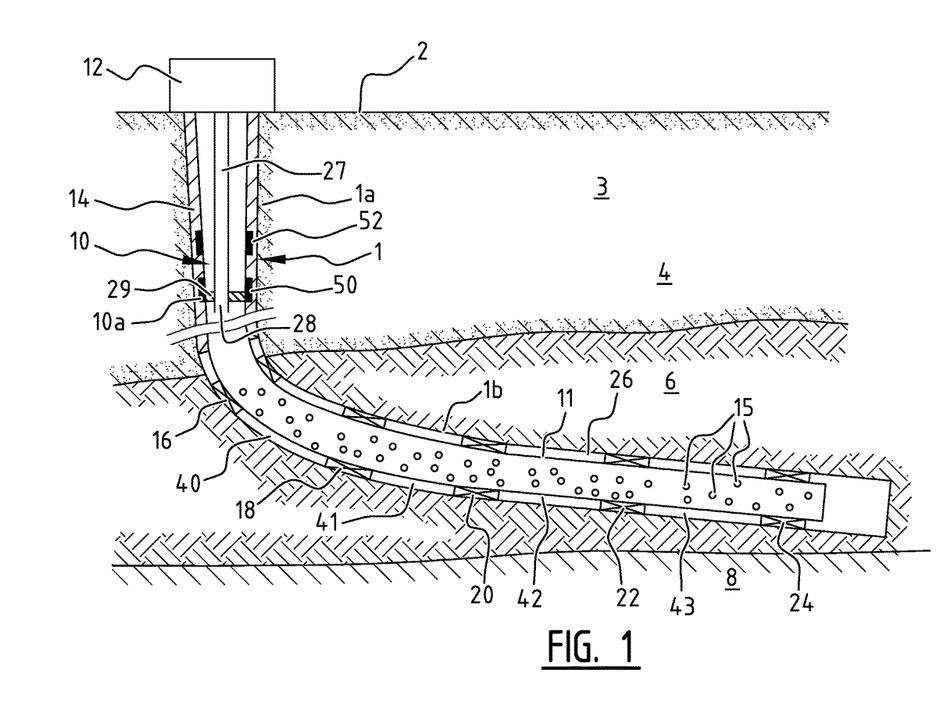
FIG. 1 schematically shows a wellbore including swellable coating.

FIG. 1 shows a wellbore system including a borehole 1 extending from surface 2 into an earth formation 3. The borehole 1 penetrates an overburden layer 4 and a reservoir zone 6 containing hydrocarbons. A formation layer 8 containing formation water may be located below the reservoir zone 6. The borehole 1 may comprise a first section 1a extending substantially vertical and through the overburden layer 4 and a second section 1b extending substantially horizontal and into the reservoir zone 6. Other trajectories of the borehole 1 are also conceivable.

A first casing string 10, comprising a number of interconnected casing sections (not shown), extends from a wellhead 12 at surface into the first borehole section 1a. A second casing string 11 extends into the reservoir zone 6, either from surface or from a downhole end 10a of the first casing string 10. The second casing 11 may be provided with a plurality of perforations 15 to enable fluid communication between the interior of the casing string 11 and the exterior thereof.

Seal assemblies 16, 18, 20, 22, 24 may be arranged at selected mutual spacings in an annular space 26 between the second casing string 11 and the wall of the second borehole section 1b. The seal assemblies may comprise swellable material, having a first unexpanded state and a second expanded state. In FIG. 1, the seal assemblies are shown in expanded state, wherein the volume and diameter of the seal assemblies has been enlarged. In the expanded state, the seal assemblies may engage their enclosure, such as the wellbore wall, as shown in FIG. 1.

Alternatively, one or more seal assemblies 50, 52 may engage the inner surface of a cast material 14, such as cement, which has been cast around the casing and the seal assemblies.

The seal assemblies may comprise a swellable coating according to the present invention.

A production tubing 27 may extend from the wellhead 12 into the first borehole section 1a to a selected location, for instance to a position at or near the transition from the first borehole section 1a to the second borehole section 1b. The production tubing 27 has an open downhole end 28, and may be provided with a seal packer 29 sealing the annular space between the tubing 27 and the first casing string 10.

The elastic curable coating composition of the invention comprises a curable elastic resin, a curing agent and a water-absorbing expansion agent.

The coating of the present invention is particularly suitable for gas wells. The coating, which may be applied on a casing to fully coat the same or coat only a part thereof, is able to absorb water from a gas phase. The coating may expand sufficiently to seal the micro annuli.

Coatings based on polyurethanes, polysiloxanes, acrylate or epoxy resins and similar thermosetting resins provide the required chemical resistance, and are hence preferred. Thus, the coating has to withstand prolonged exposure to hydrocarbons (if used in oil and/or gas wells), but also highly alkaline conditions (in view of the cement). Moreover, they may need to withstand significant temperature and pressure differences that occur in a borehole. The cured coating should therefore preferably have excellent thermal and chemical stability up to at least 120° C.

Importantly, the coatings have to be at least slightly elastic. Without elasticity, the coating may not expand sufficiently, despite the presence of a water-absorbing expansion agent.

An example of a suitable curable polyurethane resin is Devcon Flexane® 80, which is a commercially available non-shrinking scratch-resisting resin in liquid form (medium viscosity of about 10 Pascal·second) and which will cure at room temperature. This particular example is a two component kit that consists of a resin and a hardener which are mixed together immediately prior to use. It is easy to mix and pour. A suitable additive such as Flexane Flex-Add, also manufactured by Devcon Corporation, may be added to the two-component mixture of resin and hardener in order to soften the molded material. Other curable polyurethane resins are commercially available and may be used without departing from the gist of the invention.

An example of a suitable curable polysiloxane is Elastosil M4643 A/B from Wacker Chemie which is a commercially available pourable, addition-curing, two-component silicone rubber that vulcanizes at room temperature (medium viscosity of about 25 Pascal·second). Other curable polysiloxanes are commercially available and may be used without departing from the gist of the invention.

An example of a suitable curable system is a polyaspartic resin which is a commercially available non-shrinking scratch-resisting resin in liquid form which will cure at room temperature. This particular example is a two component kit that consists of a resin and a hardener which are mixed together in a static mix tube and sprayed on the substrate surface. Cure reaction is almost instantaneous. Other curable polyaspartic resins are commercially available and may be used without departing from the gist of the invention.

Curable epoxy resins are commercially available and may be used without departing from the gist of the invention.

The curable elastic resin can be a mixture of curable thermosetting resins, and may contain a diluent and/or an elastomeric component dissolved therein. More preferably, however, the curable elastic resin is composed of a compound or mixture of compounds that is liquid at room temperature with a viscosity of no greater than 30 Pascal-second under an applied shear of 10 reciprocal seconds at 25 degrees Celsius. The use of a diluent which acts as a viscosity modifier may allow the use of high molecular weight components in the coating composition. On the other hand, a non-reactive diluent will increase the time needed to obtain a fully cured coating. Accordingly, the curable coating composition preferably is composed of components that will react during the curing, which may therefore comprise a reactive diluent.

If a separate elastomeric component is used, then this preferably is a component that can form an interpenetrating network within the cured thermosetting resin. However, preferably the thermosetting resin is elastomeric.

Preferably, the cured coating composition has a Young's modulus, which is calculated by dividing the tensile stress by the tensile strain in the elastic (initial, linear) portion of the stress-strain curve of the cured coating composition that is less than 100 MPa, preferably less than 50 MPa. Preferably the cured coating has an elasticity in the range of 1 to 500 MPa. Moreover, the cured coating preferably has an elongation of at least 40% at break (at the relevant temperature but typically between 70-120° C.).

The selection of the curing agent depends on the thermosetting resin. The thermosetting resin may be a catalyst, but it may also be a hardener, i.e., a component that reacts with the thermosetting resin. It may also be a combination of a catalyst and a hardener. Preferably, the curing agent is added to the curable coating composition shortly before the application. For instance, a suitable curing agent for the "Flexane" polyurethane previously mentioned is sold under the trade name "Flexane Curing Agent".

The coating of the invention may also comprise a water-absorbing expansion agent. The water-absorbing expansion agents mentioned in WO-2005012686, WO-2006065144 or U.S. Pat. No. 6,848,505, the contents of which are herewith included by reference in their entirety, may be used. The water-absorbing expansion agent may be a salt, preferably a mild hygroscopic salt. The water-absorbing expansion agent is preferably in the form of a finely divided solid, with an average diameter in the range of 0.1-50 micron, or more preferably 1-5 micron. Suitable salts include potassium sodium carbonate ($KNaCO_3$), magnesium chloride ($MgCl_2$) or calcium chloride ($CaCl_2$). $KNaCO_3$ is preferred.

The amount of water-absorbing expansion agent is related to the selection of the materials. Preferably, it is used in an amount of 5% to 75% by weight of the coating. High amounts are preferred, to cause sufficient expansion. However, the amount should not be so high as to adversely affect the mechanical properties of the coating and/or the stability of the uncured coating composition prior to its application.

The coating composition may comprise additional coating components, including fillers, tackifying resins to improve adhesion, antioxidants, stabilizers, rust inhibitors and thixotropic agents.

In a preferred embodiment, the coating composition comprises a polysiloxane as curable thermosetting resin, preferably a polydimethylsiloxane (having the general formula $CH_3[Si(CH_3)_2O]_nSi(CH_3)_3$, where n is the number of repeating $[SiO(CH_3)_2]$ units) with $SiO_2$ as filler. This is a suitable filler also in other coating compositions according to the present invention. The $SiO_2$ concentration is preferably 0-40% by weight on the composition. In this embodiment the curing agent is preferably a cross-linker in the form of a pre-mix in the polymer compound. For instance, inhibitor PT88 from Wacker Chemie may be used, which can be added to the pre-mix in 0-10 w/w % on the polysiloxane to increase pot life. Moreover, in this preferred embodiment preferably a Pt-based catalyst is used to invoke the curing. Preferably, it is used in 1 part by weight to 10-13 parts by weight of the polysiloxane.

Preferred water-absorbing expansion agent is $KNaCO_3$, more preferably in the form of a fine powder (D50 of 50 micron). Herein, D50 is the mass-median-diameter (MMD) or log-normal distribution mass median diameter. The MMD is considered to be the average particle diameter by mass. The water-absorbing expansion agent is preferably added to the curable thermosetting resin prior to mixing with the catalyst.

Alternatively or in addition, the water absorbing agent may comprise a superabsorbent polymer (SAP). SAPs are polymers that can absorb and retain extremely large amounts of a liquid relative to their own mass. Water absorbing polymers, which are classified as hydrogels when cross-linked, absorb aqueous solutions through hydrogen bonding with water molecules. The SAP's ability to absorb water is a factor of the ionic concentration of the aqueous solution. In de-ionized and distilled water, an SAP may absorb 500 times its weight (from 30 to 60 times its own volume) and can become up to 99.9% liquid. When put into a saline solution, the absorbency drops. For instance, in a 1% NaCl solution, the absorbency may drop to about 50 times its weight.

The total absorbency and swelling capacity of the SAP may be controlled by the type and degree of cross-linkers used to make the SAP. Low density cross-linked SAPs generally have a higher absorbent capacity and swell to a larger degree. These types of SAPs also have a softer and more sticky gel formation. High cross-link density polymers exhibit lower absorbent capacity and swell, but the gel strength is firmer and can maintain particle shape even under modest pressure. High cross-link density polymers may also be more suitable to swell in saline environments, such as wellbores.

The coating compositions according to the present invention may be applied directly on a steel pipe, or a steel pipe that has been pre-treated. Preferably a steel pipe is sand blasted and treated with a primer first. Suitable primers include, for instance, WACKER® PRIMER G 790. This is a solution of various reactive siloxanes and silicone resins in a mixture of isoalkanes.

Figure 2:
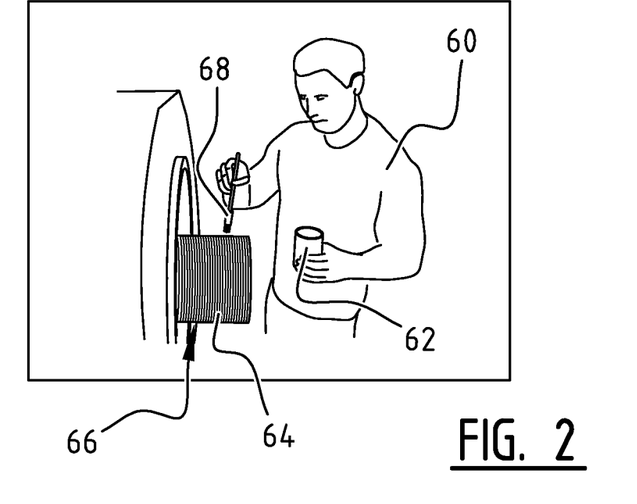
FIG. 2 shows an embodiment of a method of applying the coating.
Figure 3:
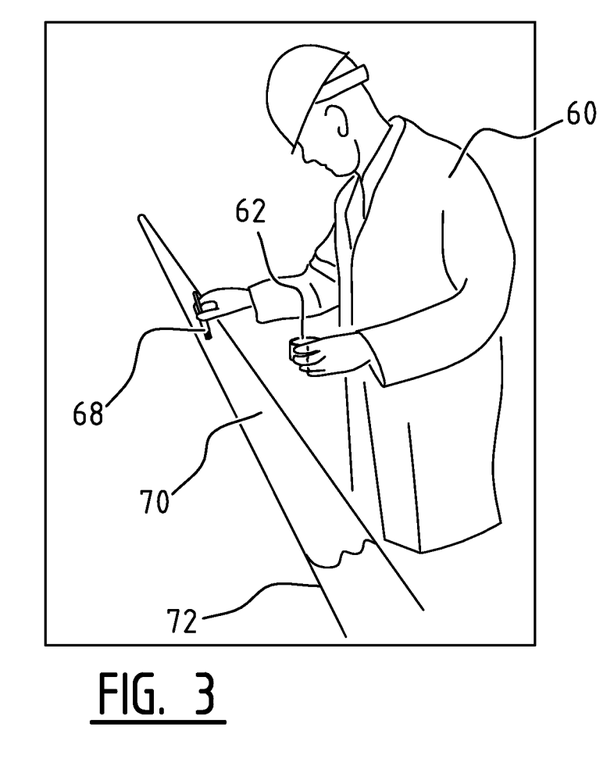
FIG. 3 shows another embodiment of a method of applying the coating.

As shown in FIGS. 2 and 3, the coating of the invention may be applied by way of a brush. The coating of the invention is preferably substantially liquid at room temperature, or at a temperature as expected at a drilling site. This allows the coating to be painted on pipe sections of oilfield tubular strings at any selected location thereof.

FIG. 2 shows an operator 60 applying the coating 62 on a threaded surface 64 of a pipe connector 66, for instance using a brush 68. Said pipe connector connects subsequent casing sections. The connector may include threaded pin and box type connectors. The coating may seal said connector upon leakage of hydrocarbon gas through the coating, thus preserving gas tightness of the connector. Herein, the coating will absorb water vapor in said gas and swell as a result, thus closing any clearances. To achieve the best results, the coating will be applied all around the threaded surface of one or both of the pin and box section of the connector.

As described above, the coating of the invention may be available at a rig site in liquid form. Just before or during make-up of the connections, the liquid coating is applied to the threads of the pin or the box of the pipe connector. During make-up, the liquid lubricant of the invention may function as a lubricant, because it is in liquid form. Only after make-up of the connector, the newly made-up section of the drill string or casing string is introduced in the wellbore. The curing time of the coating preferably exceeds the time required to make-up the connector. Thus, the coating only cures once the connector, or pipe section to which it is applied, is introduced in the wellbore. Thus, in addition to the sealing capacity, the coating of the present invention may function as pipe dope, lubricating the threaded pipe connectors during make-up.

FIG. 3 shows the operator 60 applying the coating 62 to other selected locations of the pipe, including sections of the outer surface 70 of a casing section 72. Said selected locations for instance include locations near a downhole end of the casing string. The latter may be enclosed in cast material, such as cement. When one or more micro-annuli appear in the cement over time, the coating composition of the invention will swell when contacted with water or even water vapor as included in hydrocarbon gas, and subsequently block said micro-annuli. Thus, the coating assists to preserve the integrity of the cement. Herein, the coating is preferably applied in the form of rings extending around the entire circumference of the casing.

Figure 4:
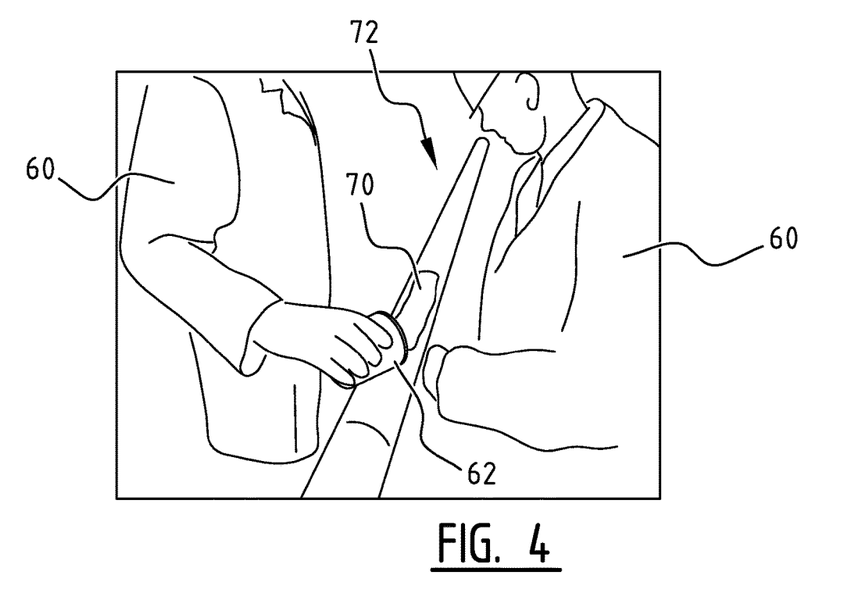
FIG. 4 shows yet another embodiment of a method of applying the coating.

In another embodiment, shown in FIG. 4, the coating 62 can be applied on the pipe section 72 and pouring the curable coating composition 62 on the outer surface, or any other location, of the pipe. Herein, the pipe section 72 may be rotated during application of the coating. The coating layer may be applied on the pipe by means of one or more guides with a defined height (layer thickness) and a scraper (not shown).

Figure 5:
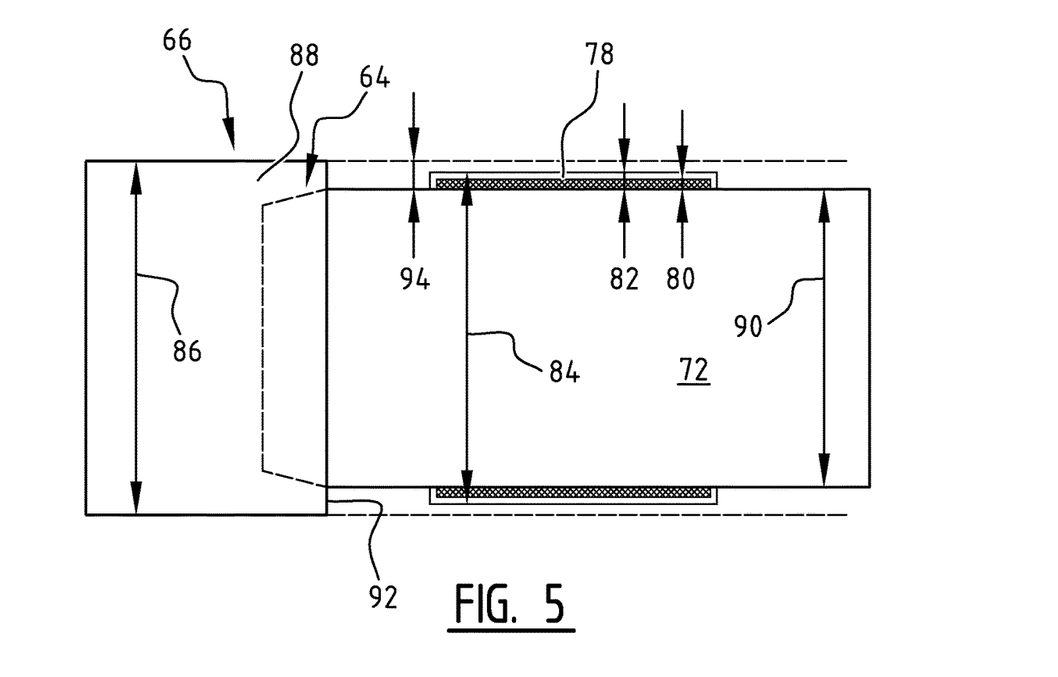
FIG. 5 shows a cross section of an embodiment of a pipe section and a coupling provided with the coating composition of the invention.

In the first, retracted state, a layer 78 of the coating composition may have a thickness 80 between 0.5-5 mm. See FIG. 5. In a second, expanded state, the coating may have a pre-determined maximum thickness 82. Said maximum thickness can be selected such that the outer diameter 84 of the swollen coating layer 78 is about equal to, or preferably less than an outer diameter 86 of a box-section 88 of the connector 66. Said box-section 88 typically has an outer diameter 86 which exceeds the outer diameter 90 of the pipe section 72, creating an upset 92. The difference 94 in diameter may typically be in the range of a few mm.

The embodiment of the invention, using the relatively thin layer of coating which in addition has a pre-determined maximum thickness in the swollen state, prevents problems during running in of the casing string into the wellbore. Otherwise, the expandable elastomer could engage water during run-in, subsequently expand, and the swollen elastomer may get stuck if the wellbore contains for instance sections having a constricted diameter. The latter may for instance be due to the deviation of the borehole (between the vertical section 1a and the inclining or horizontal section 1b, see FIG. 1). Also, sections of the borehole which traverse an unstable formation layer may have collapsed.

Curing of the liquid coating may take up to an hour. The curing time can be pre-determined, depending on the specific application and local temperature.

A testing apparatus 50 (FIG. 6) for testing swellable coating compositions may comprise a first tube 53 and a second tube 55 enclosing the first tube, with an annular space 56 in between. First end cover 51 and second end cover 52 close of opposite ends of the annular space 56. The first end cover 51 and second end cover 52 may be constrained by one or more rods 58 and corresponding bolts 60, to enable pressurizing of the annulus 56. First lid 51 and second lid 52 may be provided with first fluid passage 62 and second fluid passage 64 respectively.

Figure 6:
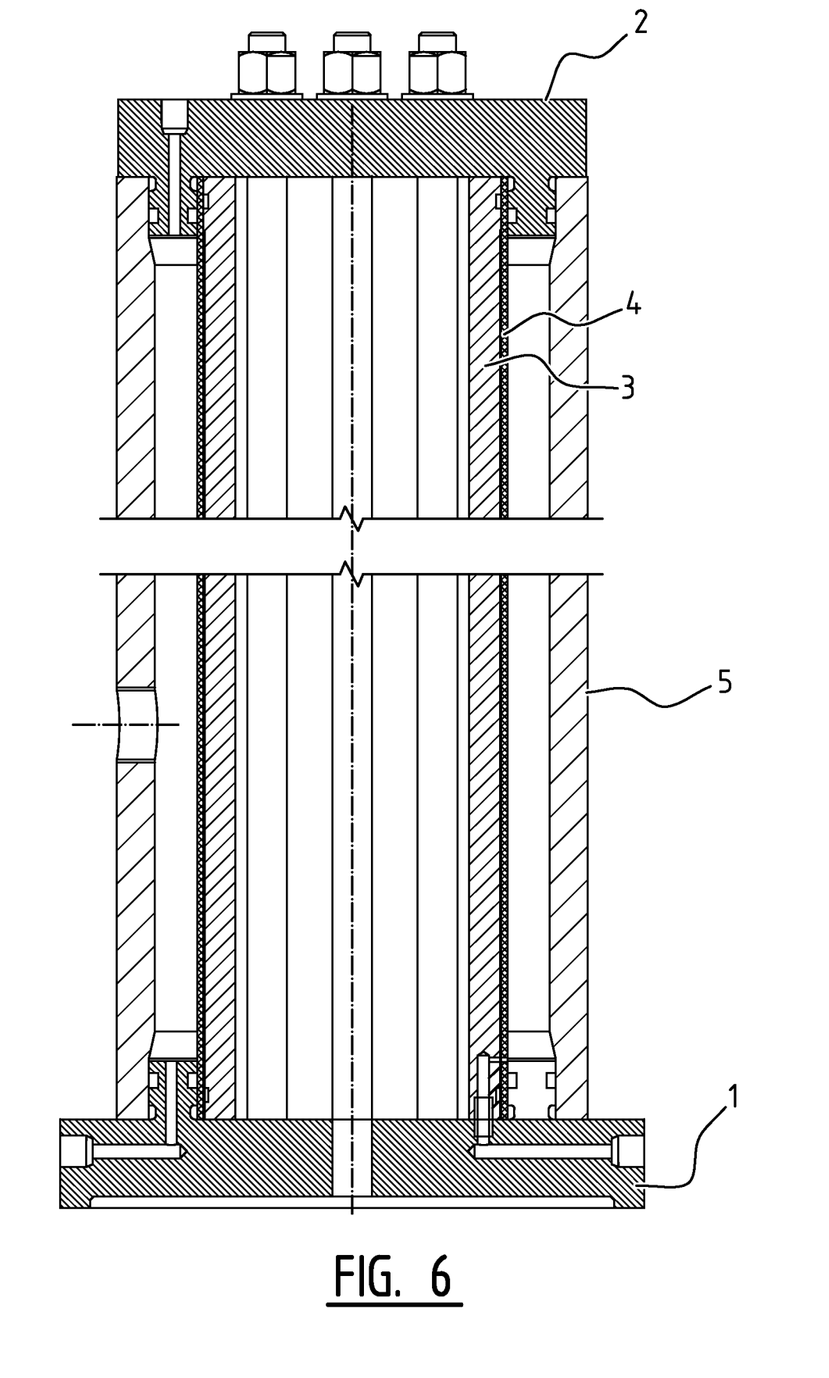
FIG. 6 shows a cross-section of a set-up to test swellable coatings.

For testing, a coating composition 54 may be applied on an outer surface of the first tube 53 (FIG. 2) and/or on the inner surface of the second tube 55.

Cement slurry (not shown), preferably suitable for application in a hydrocarbon wellbore, is then pumped into the annular space 56, filling the entire annulus. Thus, the swellable coating is in contact with the cement slurry. The cement slurry is left to set at the prevailing conditions.

A pressure test is done after the cement has set, for instance 48 hours after setting. A differential pressure is applied across the annular space with the cured cement, typically between the first and second openings 62, 64, to test the integrity of the cement. The differential pressure may be applied using for instance water, air, or hydrocarbon gas (e.g. methane). Micro-annuli would be detectable when they extend from the first cover 51 to the second cover 52. Such micro-annulus would provide a fluid passage. The fluid flow and/or a lowering of the differential pressure between the first opening 62 and the second opening 64 will be detectable.

EXAMPLE 1

To produce the coating, Flexane® 80 Liquid from Devcon is used. Flexane comprises two components, an A-component and a B-component. 16.67% w/w of dried magnesium chloride was mixed into the A-component of Devcon 801. After mixing for 30 minutes the B-component was added. Mixing continued for 3 minutes. The mixture was allowed to set and after 1 hour it was a solid mass. After 24 hours, slices of the cured samples were exposed to wet air at 20° C. and 70° C. and water at 20° C. The weight increase over time was measured which is a direct indication for the volumetric increase of the cured sample. The polyurethane-salt composite was able to absorb water from the gas phase and from the water phase.

EXAMPLE 2

The inner surface of tube 55 and the outer surface of tube 53 were sand blasted and treated with a primer. Both pipes were coated with a silicone rubber type Elastosil M4643 from Wacker chemie which was filled with 20% by weight $NaKCO_3$. The coating was allowed to cure at room temperature for 3 days. The annular space between tube 4 and 5 was filled with standard class-g cement. Subsequently, the annulus was pressurized using water to a differential pressure of 20 bars, while the apparatus 50 was heated up to 90° C. The cement was allowed to cure for 3 days. After 3 days a differential nitrogen pressure of up to 8 bars was applied over the annular space filled with cement. No gas flow was observed for several days. In two comparable experiments without the swell coating, gas leakage was observed immediately after applying the gas pressure.

The curable coating composition of the current invention is suitable for the sealing of a micro-annulus between a casing and the enclosing cement in natural gas wellbores. In a practical embodiment, when applied to the casing the coating may be up to 5 millimeters thick, preferably between 1-2 millimeters thick. The coating may be able to expand by at least 50% in thickness, more preferably by at least 100% when contacted with a selected fluid, e.g. when contacted with hydrocarbon gas containing water vapor. The elastic curable coating composition according to the invention may be based on materials that provide excellent thermal and chemical stability to temperatures of at least 120° C.

The coating composition of the invention expands readily even at moderate conditions and is relatively thin. The thin swellable coating may never have an outer diameter (even after full expansion by swell) exceeding the outer diameter of the connections (see FIG. 5). Therefore the applied coating of the invention does not limit a running clearance, in contrast to the traditional swell packer technology. In addition, the coating composition is relative easy to apply and expands readily even at moderate conditions.

The present invention is not limited to the embodiments described above, wherein various modifications are conceivable within the scope of the appended claims. Features of respective embodiments may for instance be combined.

The invention claimed is:

1. Method of applying a coating to a wellbore tubing, comprising the steps of:
providing a coating composition in a liquid state at a selected wellbore site, the coating composition comprising a curable elastic thermosetting resin, a curing agent and a water-absorbing expansion agent;
applying a coating layer of the coating composition in the liquid state to a selected location of the wellbore tubing;
introducing the wellbore tubing including the coating layer in the wellbore; and
allowing the coating layer to cure from the liquid state to a solid state during a preselected curing time period after the wellbore tubing has been introduced into the wellbore.

2. The method of claim 1, wherein the step of applying the coating layer includes painting, brushing and/or pouring the coating composition on the selected location of the wellbore tubing.

3. The method of claim 1, wherein the selected location comprises a threaded connector of the wellbore tubing.

4. The method of claim 3 further comprising the steps of:
providing a circumference of at least one of a pin and a box section of the connector with the coating composition in a liquid state; and
making up the connector by connecting the pin section and the box section of the connector, while the coating is in the liquid state.

5. The method of claim 4, wherein substantially every connector of the wellbore tubing is provided with the coating composition.

6. The method of claim 1, wherein the wellbore tubing is selected from: drill string, casing string, and liner string.

7. The method of claim 1, wherein the curable elastic thermosetting resin is composed of a compound or mixture of compounds that is liquid at room temperature with a viscosity of no greeter than 30 Pascal-second under an applied shear of 10 reciprocal seconds at 25 degrees Celsius.

8. The method of claim 1, wherein the cured coating has a Young's modulus of less than 100 MPa.

9. The method of claim 1, wherein the cured coating has an elongation of at least 40% at break.

10. The method of claim 1, wherein the elastic curable thermosetting resin is based on polyurethanes, polysiloxanes, acrylate or epoxy resins.

11. The method of claim 1, wherein the curable elastic thermosetting resin is a polyurethane, polydimethylsiloxane (PDMS), a Polyaspartic, and/or flexible epoxy resin.

12. The method of claim 1, wherein the curable elastic thermosetting resin is a PDMS.

13. The method of claim 1, wherein the water-absorbing expansion agent is a salt.

14. The method of claim 13, wherein the salt is a hygroscopic salt.

15. The method of claim 13, wherein the salt is in the form of a finely divided solid.

16. The method of claim 1, wherein the water-absorbing expansion agent is used in an amount of 20 to 70% by weight on the total coating composition.

17. The method of claim 1, wherein the coating composition further comprises a filler, a tackifying resin, an antioxidant, a stabilizer, a rust inhibitor, a thixotropic agent, or a combination of one or more of each of these components.

18. The method of claim 17, wherein the coating composition comprises $SiO_2$ as the filler in a concentration of 0-40% by weight on the total coating composition.

19. The method of claim 1, wherein the water-absorbing expansion agent is an absorbent polymer.

20. The method of claim 1, wherein the cured coating has a Young's modulus of less than 50 MPa.

* * * * *